(12) United States Patent
Cain (10) Patent No.: US 7,519,996 B2
(45) Date of Patent: Apr. 14, 2009

(54) SECURITY INTRUSION MITIGATION SYSTEM AND METHOD

(75) Inventor: Stuart Cain, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 790 days.

(21) Appl. No.: 10/648,555

(22) Filed: Aug. 25, 2003

(65) Prior Publication Data

US 2005/0050351 A1    Mar. 3, 2005

(51) Int. Cl.
    *G06F 12/16* (2006.01)
(52) U.S. Cl. .................................. 726/23; 726/25
(58) Field of Classification Search ................. 726/23
    See application file for complete search history.

(56) References Cited

U.S. PATENT DOCUMENTS 5,850,516 A * 12/1998 Schneier ....................... 726/25
6,535,227 B1 * 3/2003 Fox et al. ...................... 715/736
6,952,779 B1 * 10/2005 Cohen et al. .................. 726/22
2002/0073338 A1 * 6/2002 Burrows et al. ............... 713/201
2005/0022018 A1 * 1/2005 Szor ............................ 713/201

FOREIGN PATENT DOCUMENTS

GB    2 372 400    8/2002

OTHER PUBLICATIONS

IEEE Colloquium on risk Analysis Methods and Tools, Jun. 3, 1992, pp. 6/1-6/5, London, UK, "Security Modelling", Gordon, J.

* cited by examiner

*Primary Examiner*—Kambiz Zand
*Assistant Examiner*—Aubrey H Wyszynski (57) ABSTRACT

A security intrusion mitigation system and method are presented. In one embodiment a security intrusion mitigation method includes utilizing network spanning tree configuration information to determine an action for mitigating diffusion of intrusive attacks. The spanning tree information can include an indication of an internal diffusion risks. An action for mitigating diffusion of intrusive attacks is automatically performed. The action for mitigating diffusion of the intrusive attacks includes compensation for functional support of prioritized applications.

20 Claims, 7 Drawing Sheets

100

```
┌─────────────────────────────────────────────────────┐
│  Determining the asset value of a network node.     │
│                         110                         │
└─────────────────────────────────────────────────────┘
                          │
                          ▼
┌─────────────────────────────────────────────────────┐
│  Ascertaining the exposure rating of the network node. │
│                         120                         │
└─────────────────────────────────────────────────────┘
                          │
                          ▼
┌─────────────────────────────────────────────────────┐
│  Establishing a functional priority risk indicator for indicating │
│  the likelihood of an attack from another network node. │
│                         130                         │
└─────────────────────────────────────────────────────┘
                          │
                          ▼
┌─────────────────────────────────────────────────────┐
│  Creating a spanning tree schematic of a network including │
│  the network node, wherein the spanning tree schematic │
│  includes an indication of the asset value.         │
│                         140                         │
└─────────────────────────────────────────────────────┘
```

Utilizing network spanning tree configuration information including an indication of an internal diffusion risk to determine an action for mitigating diffusion of intrusive attacks.
510

Performing the action for mitigating diffusion of intrusive attacks automatically, including compensation for functional support of prioritized applications.
520

SECURITY INTRUSION MITIGATION SYSTEM AND METHOD

FIELD OF THE INVENTION

The present invention relates to security. More particularly, the present invention relates to a system and method for providing security intrusion mitigation.

BACKGROUND OF THE INVENTION

Electronic systems and circuits have made a significant contribution towards the advancement of modem society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Frequently, electronic systems designed to provide these advantageous results are realized through the use of networked resources that facilitate leveraged use of centralized utility and data resources by distributed components. While the leveraged utilization of the centralized resources is advantageous, organization and maintenance of the centralized resources is usually very complex and often susceptible to the spread of detrimental intrusive attacks.

Centralizing certain resources within a distributed network typically provides desirable benefits. For example, centrally storing and/or processing information typically reduces wasteful duplicative storage and/or processing resources at each remote networked system. In addition to increasing efficiency, the functions provided and supported by centralized resources typically have significant economic value. The ever increasing demand for centralized type services is largely attributable to the ever growing cost of specialized information technology services and the increasing complexity of managing mission critical Enterprise and Internet applications. Interruptions in services and support for important applications implemented by the centralized resources due to intrusive attacks can be very costly. In supporting desirable flexibility and extensibility, centralizing resources can involve handling diverse applications, architectures and topologies (e.g., associated with a multi-vendor environment). Managing the infrastructure of a large and complicated centralized networked resource environment and protecting the resources from intrusive attacks raises many challenging operational issues.

Providing security for important centralized network assets is usually very important and also often complex. Offering ubiquitous access to a diverse set of centralized resources introduces challenges associated with protecting the centralized resources from intrusive attacks (e.g., that can detrimentally affect service quality). Modem networks can be very extensive and typically include numerous potential points of attack for intrusion. If an attack is able to "infiltrate" or overcome security measures at a particular point there is often an opportunity for the attack to spread rapidly and relatively unimpeded throughout a network. The devices in a network can be configured or associated to provide functionality and/or service for a variety of applications. Attacks directed to a single device or aspect of a network can be very harmful. The spread of the attack or intrusion throughout a network internally to impact applications implemented on and/or supported by the network can be devastating.

Intrusion attempts directed towards centralized resources are usually initially directed at penetrating from a single point or device and then to spread from that device to other devices in a centralized resource network or "internal" network. Traditional intrusion protection systems typically focus on preventing the initial breach of an individual component from devices outside internal networks. For example, a host intrusion detection system (HIDS) usually tries to detect intrusion on a host and a network intrusion detection system (NIDS) usually tries to detect intrusions directed at traffic on a network segment. While traditional intrusion protection often provides an initial line of defense or intrusion protection, breaching individual component security measures often occurs at an undesirable rate.

The most significant damage resulting from an intrusive attack on a component of a network usually occurs as a result of an intrusive attack spreading throughout the network. For example, an attack may be initially directed towards a relatively unimportant and/or unprotected component of a network. In and of itself the initial attack on a "weak" component may have little or no practical affect on the performance and functionality of the components in supporting various applications and systems, including important applications and systems. This may even be a reason for not expending security protection resources to protect the component. However, if the attack spreads from the "weak" component to a more critical component (e.g., a component that provides significant functionality for supporting important applications and systems), it could have a very significant affect on crucial performance and functional support. Even if significant resources are expended to protect the important component from attacks outside the network, they are essentially wasted if the component is susceptible to attacks from other components within the network. This is a significant consideration since once an initial breach is made, attacks typically spread in traditional systems and networks with little or no opposition.

Identifying devices in a centralized resource network or internal network that support important applications and are relatively more susceptible to attack internally is often complicated. Traditional attempts at preventing the spread of an attack usually involves manual coordination and analysis of individual alarms and potential impact on other devices in a system. Prior attempts at stopping the spread of an attack are usually laborious and often requires a significant level of knowledge and expertise on the priority of different applications and the functionality particular network components contribute to the applications. The complexity of a network and the numerous different applications and/or systems that rely on a component can also increase susceptibility to flaws associated with human error, which tends to increase when attempting to identify the important and susceptible internal centralized resources during an intrusive attack.

In addition to detecting the potential for an intrusion attempt to spread, it is usually desirable to implement corrective action. Traditional attempts at responding to spreading of intrusive attacks from one component to another are also usually resource intensive and laborious. Understanding the possible appropriate corrective mechanisms to implement an effective prevention strategy and the impact of the attacks and/or corrective measures on applications is complex and traditionally a difficult endeavor. The fundamental manual approach of traditional systems is relatively slow compared to typical attack spread rates, which often permits the attack to penetrate more components and systems before a corrective action can be taken.

SUMMARY OF THE INVENTION

A security intrusion mitigation system and method are presented. In one embodiment a security intrusion mitigation method includes utilizing network spanning tree configuration information to determine an action for mitigating diffusion of intrusive attacks. The spanning tree information can include an indication of an internal diffusion risks. An action for mitigating diffusion of intrusive attacks is automatically performed. The action for mitigating diffusion of the intrusive attacks includes compensation for functional support of prioritized applications.

BRIEF DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood the present invention may be practiced without these specific details. In other instances, some readily understood methods, procedures, components, and circuits have not been described in detail as not to unnecessarily obscure aspects of the current invention.

The present invention facilitates rapid identification and mitigation of potential security attack diffusion threats. The present invention is capable of prioritizing the functionality provided by components and factoring the prioritization into a security threat indication and response. In one embodiment, a spanning tree representation of a centralized resource network (e.g., server farm, UDC, etc.) is built with asset value and exposure or connectivity indicators that are utilized to determine a risk indicator. The risk indictor indicates the relative threat of disruption to important applications and information supported by a component. In one exemplary implementation, the asset value corresponds to the economic value of functions provided by a network component in the support of various applications. The present invention also reduces resources required to determine implement an effective mitigation actions to reduce the susceptibility to an intrusive attack spreading throughout a network internally.

Figure 1:
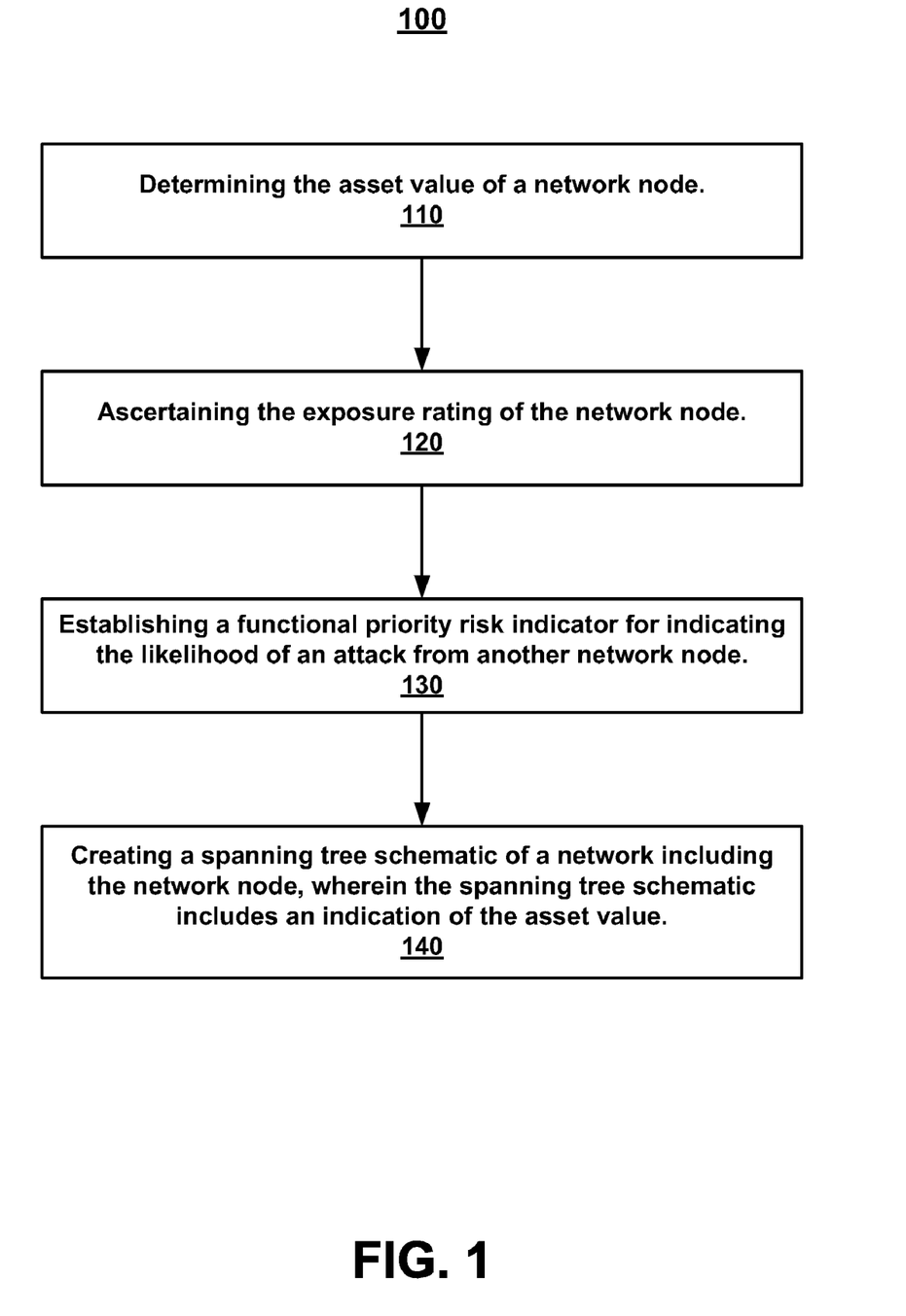
FIG. 1 is a flow chart of a security indication spanning tree method in accordance with one embodiment of the present invention.

FIG. 1 is a flow chart of security indication spanning tree method 100 in accordance with one embodiment of the present invention. Spanning tree method 100 provides a spanning tree representation of a network with potential internal attack indications. The indications can include factors for susceptibility of a component to attack from other components in the network and importance or impact of a disruption in the operations of a component with respect to support for various applications.

In step 110, the asset value of a network node is determined. In one embodiment the asset value provides an indication of the economic value or utility of the functions provided by the network node. In one exemplary implementation the asset value corresponds to the economic impact of a disruption to the functionality provided by the network node. For example, if a disruption in operations to a particular network node (e.g., due to an intrusion attack) has a high economic impact the network node can be assigned a relatively high asset value indicator (e.g., a value of 9 out of possible 10 maximum). If the disruption in operations to a particular network node has a moderate economic impact the network node can be assigned a moderate asset value indicator (e.g., a value of 5 out of possible 10 maximum). If the disruption in operations to a particular network node has a low economic impact the network node can be assigned a relatively low asset value indicator (e.g., a value of 2 out of possible 10 maximum).

The exposure rating of the network node is ascertained at step 120. In one embodiment of the present invention, an exposure rating defines a threshold value corresponding to the connectivity of the network node with other network nodes. In one exemplary implementation, each network node is given an exposure rating value depending upon its "connectivity distance" (e.g., number of nodes) from a root node (e.g. a root node can be the node "closest" or directly coupled to an external network), with the root node having the highest value. The further the network node is from the root node the smaller the exposure rating value. The bandwidth of connections between network nodes can also be factored into the exposure rating value. For example, links with high bandwidth can increase the exposure rating.

With continued reference to FIG. 1, a functional priority risk indicator for indicating the likelihood of an attack from another network node is established in step 130. The functional priority can be associated with the economic benefit or utility a particular functionality provides. In one embodiment of the present invention, an analysis of the functional priority risk indicator includes consideration of the importance or value of the network node to a preferred functionality and the susceptibility of the network node to attack. The analysis can utilize the exposure rating value and the asset value to establish a functional priority risk value. For example, the functional priority risk can be defined by an exposure value of a particular network node plus twice the asset value.

In step 140, a spanning tree schematic of a network node including the network node is created, wherein the spanning tree schematic includes an indication of the network node asset value. The spanning tree schematic can also include an indication of the exposure rating and an indication of the risk to preferred or high priority functionality. The spanning tree schematic can also provide an indication of the interconnections of a network node to other network nodes.

The present invention is applicable to centralized resources communicatively coupled to form an "internal" network. For example, the "internal" network can be an organization or corporate network with few communication interfaces to other "external" components and/or network thereby forming a relatively isolated and distinct "internal" network. In one exemplary implementation centralized resources form a utility data center (UDC) communicatively configured in a local area network (LAN).

Figure 2:
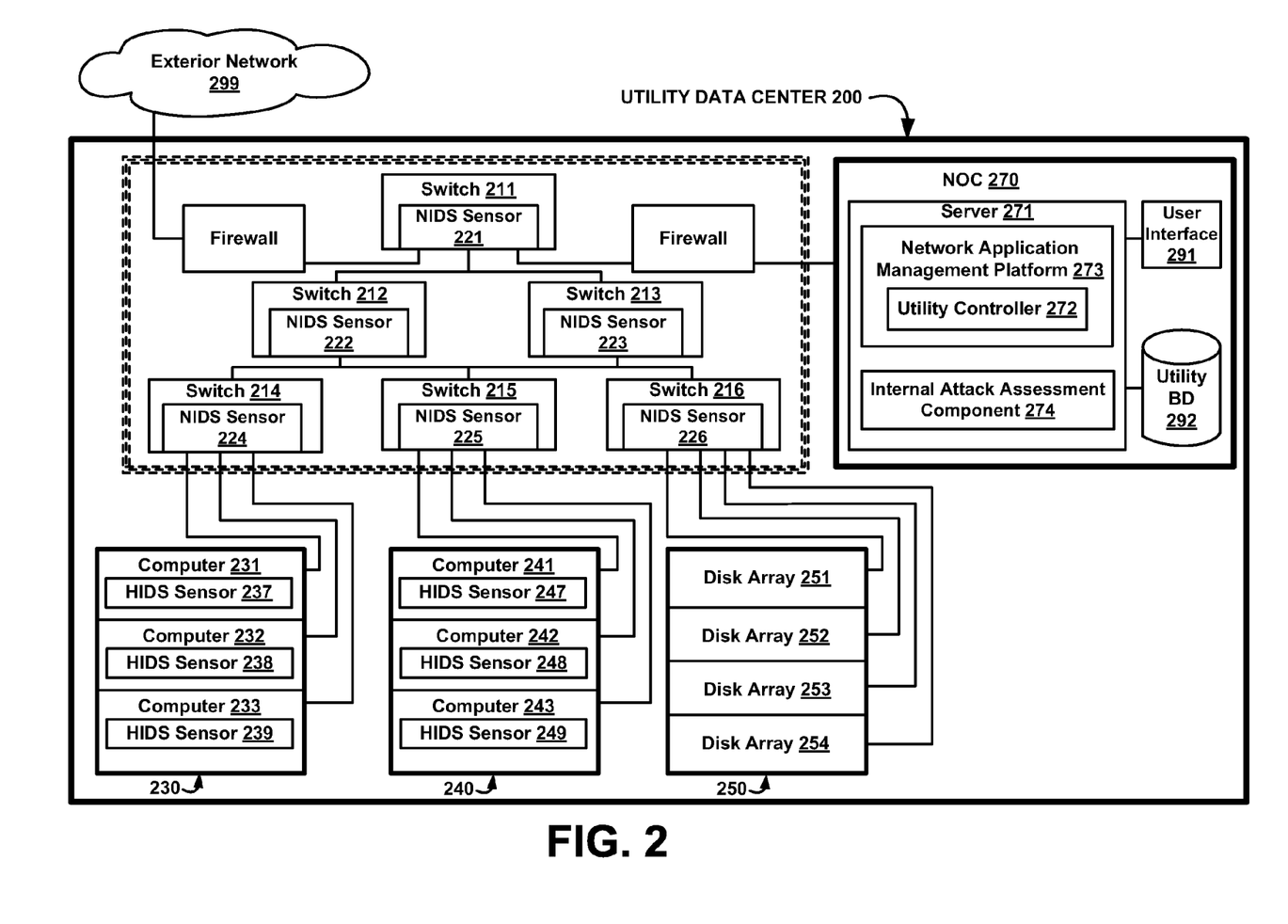
FIG. 2 is a block diagram of an exemplary utility data center (UDC) upon which embodiments of the present invention can be implemented.

FIG. 2 is a block diagram of an exemplary utility data center (UDC) 200 upon which embodiments of the present invention can be implemented. In one embodiment, UDC 200 provides open system support for a plurality of multi-vendor computing resources. As such, the UDC 200 can provide support to computing resources that provide a variety of functions (e.g., firewalls) to numerous different systems and applications. In one embodiment, UDC 200 forms an internal network that is communicatively coupled to exterior network 299. It is appreciated that UDC 200 can include elements in addition to those shown (e.g., more racks, computers, switches and the like), and can also include other elements not specifically shown or described herein. Furthermore, the blocks shown by FIG. 2 can be arranged differently than that illustrated, and can implement additional functions not specifically described herein. It is also appreciated that a number of components (e.g., utility controller, firewalls, servers, etc.) included in UDC 200 can be implemented in varying degrees of hardware, firmware and/or software.

In the present embodiment, UDC 200 includes switches 211 through 216, equipment racks 230, 240 and 250 and network operations center 270. NID sensors 221-226 are associated with respective switches 211-216. The switches 211 through 216 are communicatively coupled to each other in a switch fabric organization. Each equipment rack 230, 240 and 250 include various equipment. For example, equipment rack 230 includes computers 231 through 233 communicatively coupled to switch 214, equipment rack 240 includes computers 241 through 243 communicatively coupled to switch 215, and equipment rack 250 includes disk arrays 251 through 254 communicatively coupled to switch 216. HID sensors 237-239 are associated with respective computers 231-233. HID sensors 247-249 are associated with respective computers 241-244. It is appreciated that the switches 211 through 216 can be coupled to other equipment (not shown), including computers that are not included in an equipment rack. In this embodiment, the switches and computer systems are interconnected using cables or the like. However, wireless connections between devices in UDC 200 are also contemplated.

In general, UDC 200 includes a programmable infrastructure that enables the virtual connection of selected computing resources as well as the isolation of selected computing resources, thereby enabling security and segregation of computing resources at varying infrastructure levels. The resources included in UDC 200 can be dynamically programmed to logically reconfigure and "separate" the resources into a number of various virtual local area networks (VLANs). In one exemplary implementation, NOC 270 includes server 271 coupled to a user interface 291 and a utility database 292.

The NOC 270 provides for overall control over the UDC 200. In one embodiment, the NOC 270 acts as an interface to the UDC 200 and is manned by network technicians that monitor the management and allocation of computing resources in the UDC 200. The interface also provides spanning tree schematic information and asset value information for each component of the spanning tree in a coordinated and organized user friendly easy to comprehend presentation. The presentation can also include a exposure rate value for each component and an impact risk indictor for each component of UDC 200. The risk indicator provides an indication of risk to a preferred functionality due to an attack from another internal component.

Utility controller database 292 comprises configuration information pertaining to the various resources in UDC 200, including descriptions of the configuration, characteristics, and/or features of a component. For example configuration information can include but not necessarily be limited to indications of the types of devices in UDC 200, representations of each VLAN, a network or MAC (media access control) address for the resources of UDC 200, port numbers of the configurable components, VLAN identifiers associated with each of the port numbers, socket identifier for each cable connected to each of the resources of UDC 200, manufacturer identifiers, model indicators, and/or serial numbers. Utility controller database 292 also includes an exposure rating value and an asset value for each resource in UDC 200. As resources in UDC 200 are changed (e.g., reallocated), the information in utility controller database 250 is also changed accordingly (e.g., to reflect the reallocation). Changes to the utility controller database 250 can also be used to drive changes to the allocation of resources in UDC 200.

In one embodiment, utility controller database 292 is embodied as a computer-readable network map. The map can represent a spanning tree configuration of the resources included in UDC 200. It is understood that such a map need not exist in the form conventionally associated with human-readable maps. It is also appreciated that a computer-readable network map can be synthesized on-the-fly from the information stored in utility controller database 292. The network map can include information pertaining to each of the computing resources in the UDC 200 (e.g., configuration attributes, asset value, exposure rating, risk indicator, etc.).

Server 271 includes a network application management platform 273 (e.g., an open view operation network application management platform) for managing resources in UDC 200 in accordance with information included in utility database 292. For example, utility controller 272 enables the creation, deployment, allocation, and management of VLANs. In one exemplary implementation, utility controller 272 can monitor deployed VLANs, and automatically reallocate resources when there is a reason to do so. In addition, the utility controller 272 monitors shared infrastructure resources, alerting NOC 270 of failures or other significant events. utility controller 272 utilizes network application management platform 273 to manage resources in UCD 200.

Internal attack assessment component 274 directs creation of the spanning tree representation including asset value indications and exposure ratings. Internal attack assessment component 274 coordinates the collection of asset value and exposure ratings for each of the components included in UDC 200 and provides a topological view of the relative risk on an attack on one component or element has on another component or element of UDC 200. The centralized user friendly efficient coordination and correlation of the internal attack spread threat to UDC 200 as disclosed herein, helps in reducing cost by facilitating reduction of the number of operators having specialized knowledge of associated with each component of included in UDC 200 and the importance and nature of the functionality provided by those components in supporting various application implementations.

In one embodiment of the present invention, internal attack assessment component 274 automatically determines asset value indications. In one exemplary implementation, the asset value indication corresponding to certain types of applications are maintained (e.g., in a table) and when an application is selected for deployment in association with components of a centralized resource network the asset value indication is assigned to the components. It is appreciated that there is a variety of ways in which an asset value can be automatically determined. For example, the number of security appliances or applications (e.g., Firewalls, IDS components, etc) between a centralized resource network component or network node and a root node can be tracked and components with more protection can be assigned a higher asset value. Components usually reserved for mission critical applications (e.g., high availability components or clusters) and/or particular components (e.g., a database server) can be assigned high asset values. Types of components that provide functionality more directed to facilitation of processing rather than processing the information directly (e.g., nodes, load balancers, proxy servers, network services) can be assigned a mid range asset value. The component size and operating system can be analyzed and assigned an asset value accordingly (e.g., larger size receives higher asset value).

In addition to computer systems and switches, the UCD 200 can include other types of components such as, but not limited to, routers, load balancers, firewalls, and hubs. These other types of devices may also be programmable or configurable. Although described primarily in the context of UDC 200, the features of the present invention are not so limited. The present invention can be used with a variety of components in various configurations.

Figure 3:
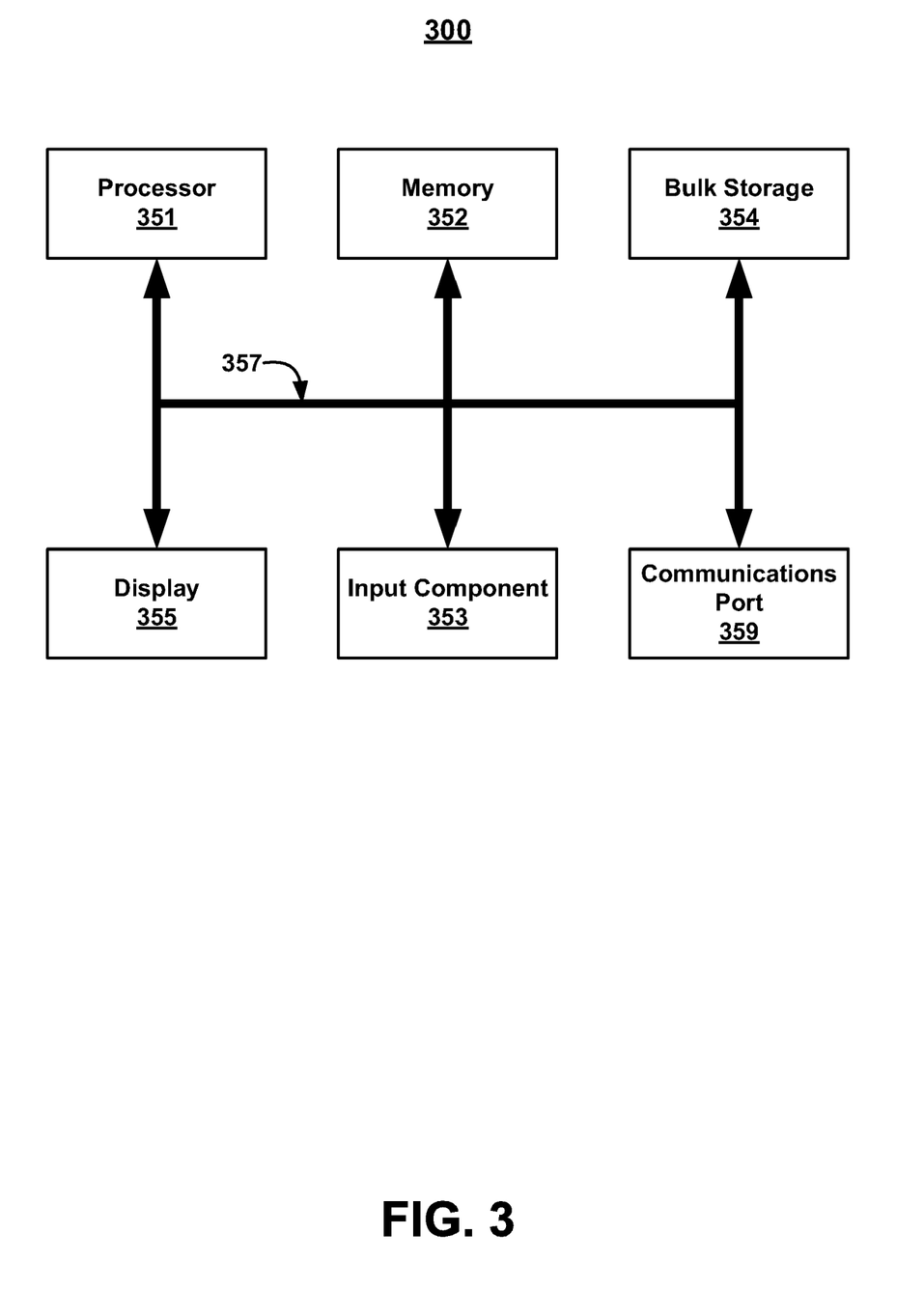
FIG. 3 is a block diagram of a computer system on which a present invention security indication spanning tree system and method can be implemented.

FIG. 3 is a block diagram of computer system 300, one embodiment of a computer system on which a present invention security indication spanning tree system and method can be implemented. For example, computer system 300 can be utilized to implement security indication spanning tree method 100 and/or Network Operation Center 270. Computer system 300 includes communication bus 357, processor 351, memory 352, input component 353, bulk storage component 354 (e.g., a disk drive), network communication port 359 and display module 355. Communication bus 357 is coupled to central processor 351, memory 352, input component 353, bulk storage component 354, network communication port 359 and display module 355.

The components of computer system 300 cooperatively function to provide a variety of functions, including performing indication of internal spread threats associated with intrusive attacks in accordance with the present invention. Communication bus 357 communicates information. Processor 351 processes information and instructions, including instructions for building an attack impact susceptibility spanning tree representation including asset value factors. For example, the instructions can include directions for determining asset value of a network node; ascertaining exposure rating of the network node; analyzing impact risk to a preferred functionality due to an attack from another network node; and creating a spanning tree schematic of a network including the network node, wherein the spanning tree schematic includes an indication of the asset value. Memory 352 stores information and instructions, including instructions for building an attack impact susceptibility spanning tree representation including asset value factors. Bulk storage component 354 also provides storage of information. Input component 353 facilitates communication of information to computer system 350. Display module 355 displays information to a user. Network communication port 359 provides a communication port for communicatively coupling with a network.

Figure 4:
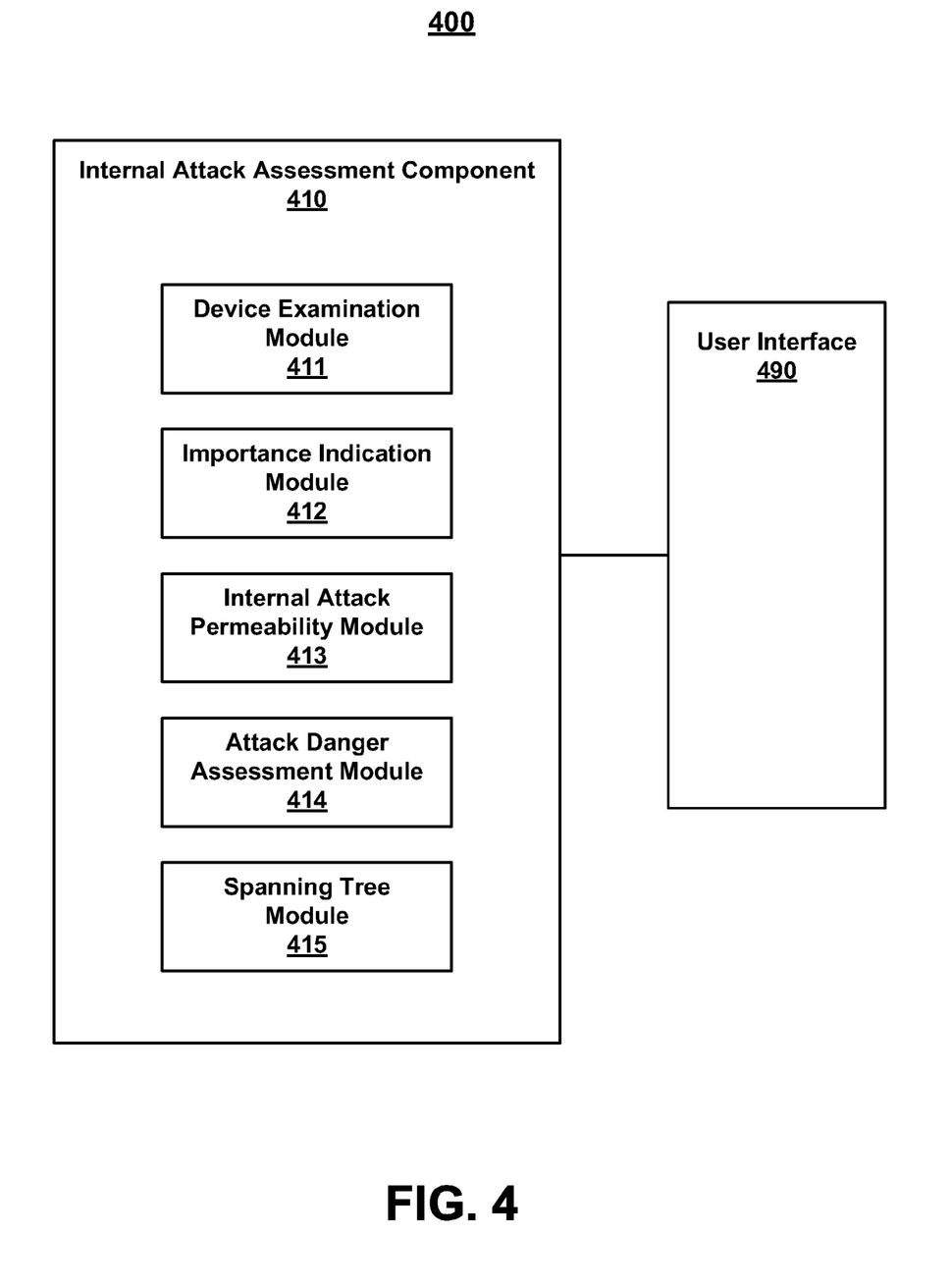
FIG. 4 is a block diagram of a security indication spanning tree system in accordance with one embodiment of the present invention.

FIG. 4 is a block diagram of security indication spanning tree system 400 in accordance with one embodiment of the present invention. In one embodiment security indication spanning tree system 400 is implemented on a computer system (e.g., computer system 300). Security indication spanning tree system 400 includes internal attack assessment component 410 and user interface 490. User Interface 490 provides an user interface for presenting asset value, exposure rating and risk to a user in a convenient and user friendly presentation. User interface 490 can also receive user input. Internal attack assessment component 410 includes device examination module 411, importance indication module 412, internal attack permeability module 413, attack danger assessment module 414, and spanning tree module 415, which can include computer readable instructions (e.g., software, programmable code, etc). For example, security indication spanning tree system 400 can include computer readable program code embodied on a computer usable storage medium, wherein the computer readable program code causes a computer system to implement security indication spanning tree instructions.

Device examination module 411 examines information regarding devices included in a centralized resource network (e.g., server farm, UDC, etc.). The examination includes ascertaining a device identification (e.g., MAC address, IP address, etc.) and which applications the devices provide functional support to. For example, whether a device provides functional support for important organization information (e.g., company information) or functional support for a web server.

Importance indication module 412 obtains an indication of the relative importance of the functionality provided by the device. For example, functional support for important organization information (e.g., company information) can be more important than functional support for a web server.

Internal attack permeability module 413 investigates the permeability of a network in permitting an intern attack on a device from other devices included in the network. In one embodiment the investigating includes analyzing the ease of attack on the device from other devices in a centralized resource network and assigning an connectivity openness or exposure threshold value to the device based upon the analysis of the ease of attack.

Attack danger assessment module 414 assesses the danger of an attack from other devices included in the network. In one embodiment of the present invention, assessing the danger includes deriving an attack danger indication based upon the indication of the relative importance of the device and the exposure threshold value and associating the attack danger indication with the device.

Spanning tree module 415 builds a spanning tree topology representation including an indication of the relative importance of the device in supporting applications. For example, the devices operations that facilitate application implementation. In one embodiment the relative importance of the device is based upon an economic value of functions the device performs in support of the applications.

Figure 5:
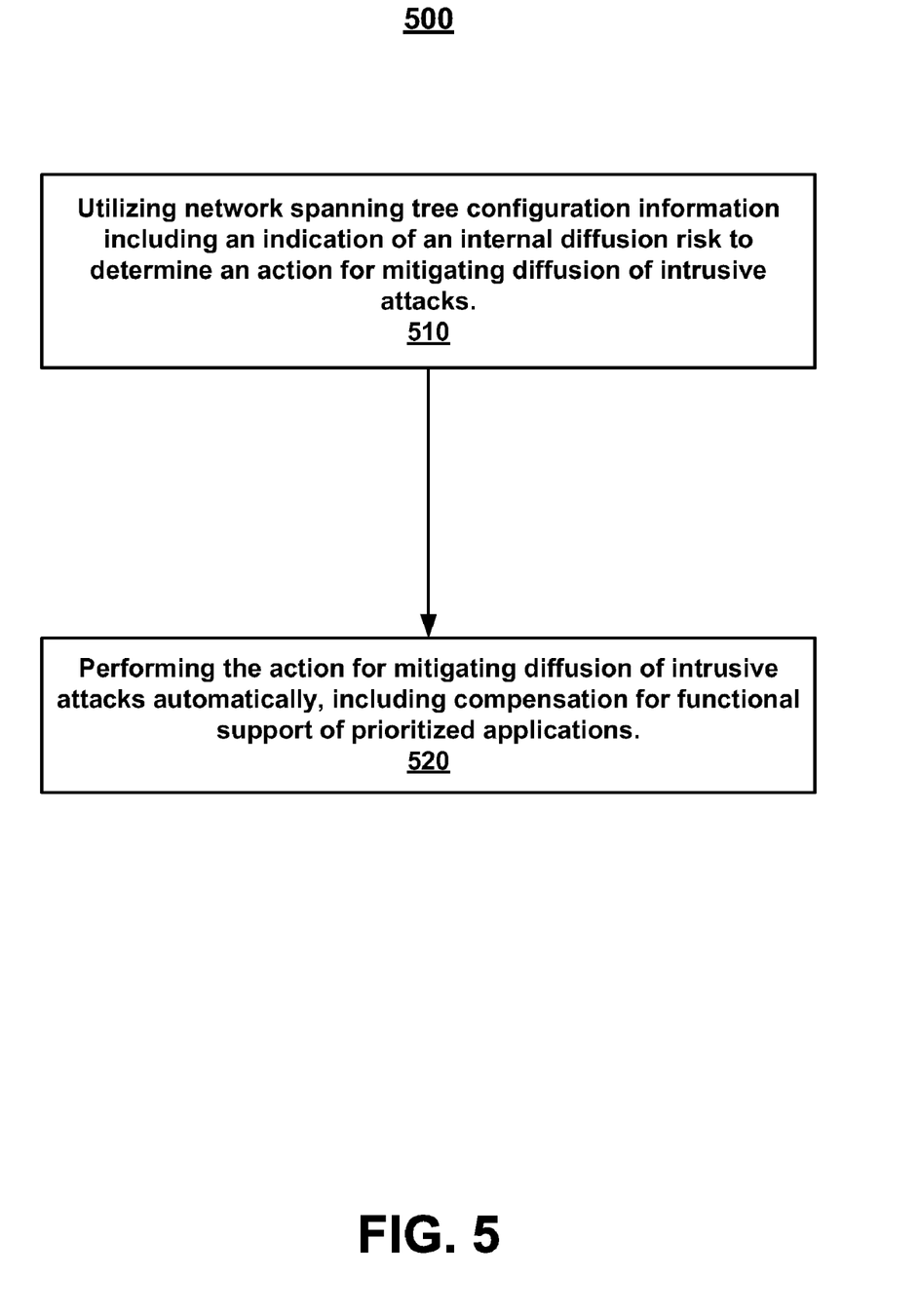
FIG. 5 is a flow chart of a security intrusion spreading mitigation method in accordance with one embodiment of the present invention.

In one embodiment of the present invention, spanning tree information is utilized to mitigate security intrusion penetration internally. FIG. 5 is a flow chart of security intrusion spreading mitigation method 500 in accordance with one embodiment of the present invention.

In step 510, network spanning tree configuration information is utilized to determine an action for mitigating diffusion of intrusive attacks. For example, an action to mitigate the spread (e.g., internally) of an attack from one component of a centralized resource network to another component of a centralized resource network is determined. The spanning tree information includes indications of internal attack diffusion or penetration risks (e.g., the risks of attacks spreading internally with adjustments for functional importance). In one embodiment, the internal diffusion risk values (e.g., a functional priority risk indicator or value, impact risk value, internal attack spreading risk. etc.) are utilized to determine components forming a path in a spanning tree configuration with the highest cumulative diffusion impact risk. In one exemplary implementation, the cumulative value of the risks assigned to each network component is ascertained as part of a greatest or highest risk path algorithm. The risk can include an asset value factor. For example, the asset value can correspond to an economic impact of a disruption to functionality provided by a network component or node. The risk can also include an exposure rating factor. For example, the exposure rating can define a threshold value corresponding to connectivity of a network component or node with other network components or nodes.

In step 520, the action for mitigating diffusion of intrusive attacks is performed automatically. The diffusion mitigation actions include consideration of and compensation or adjustment for impacts to functional support for prioritized applications. In one embodiment of the present invention, the attack mitigation action is implemented in accordance with a highest risk algorithm. For example, mitigation action is implemented on components in a spanning tree configuration communication path with the highest cumulative value of diffusion risks assigned to network components. The mitigation actions can include provisioning capabilities for threatened components.

Figure 6:
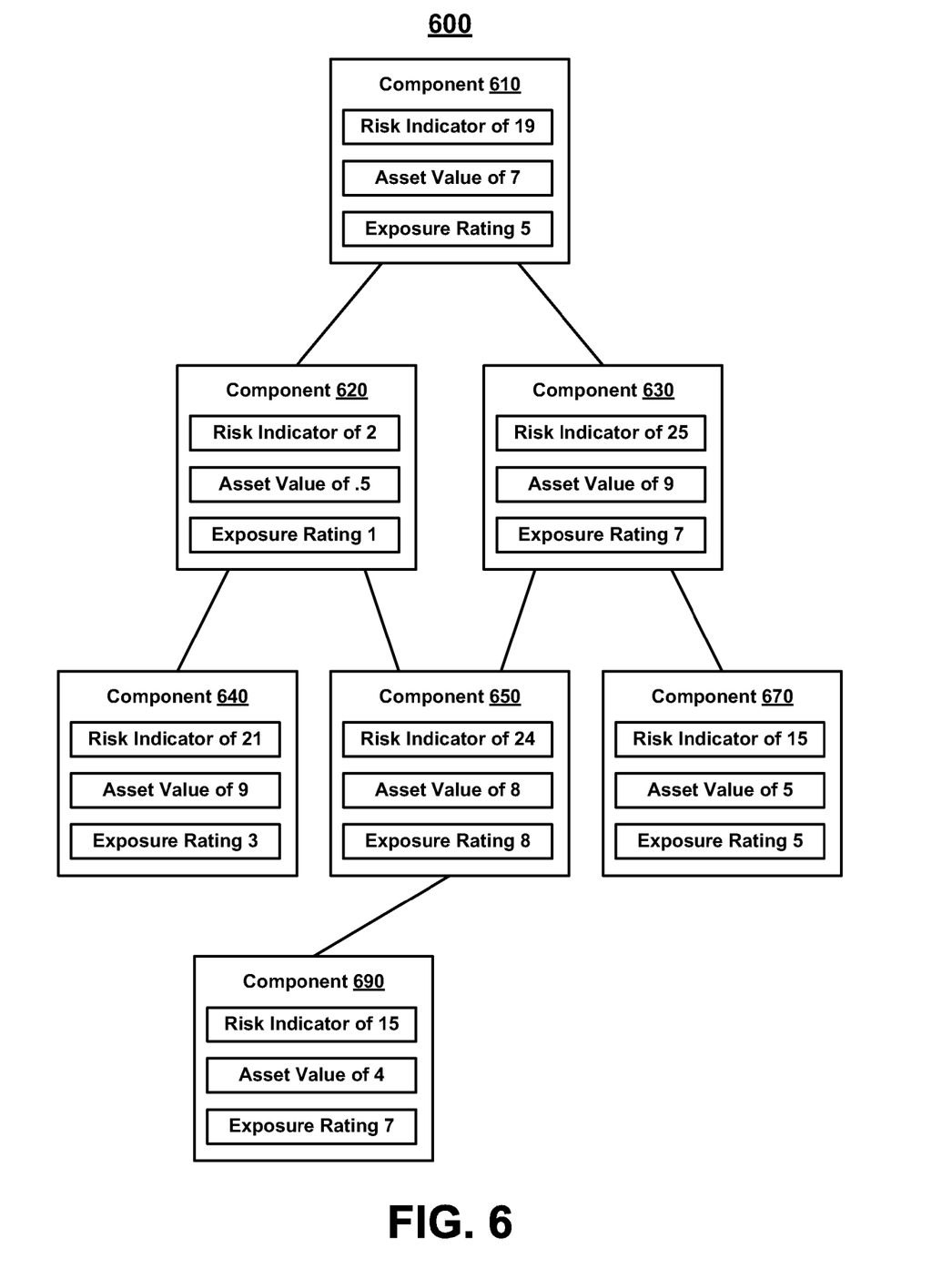
FIG. 6 is a block diagram illustration of one exemplary spanning tree in accordance with the present invention.

FIG. 6 is a block diagram illustration of one exemplary spanning tree representation 600 in accordance with the present invention. Spanning tree representation 600 includes component representations 610 through 690. Each component 610 through 690 representation includes an a risk indicator value, an asset value and an exposure rating value. In accordance with one exemplary implementation of the present invention, if an attack attempt penetrates the security measures of component 610, diffusion mitigation actions are applied to component 630, 650 and 690 before components 620, 640 and 670 since components 630, 650 and 690 are on the highest risk path.

There are a variety of mitigation actions that can be applied. For example, a component can be automatically gracefully removed from the network (e.g., a communication interface in the component can be disabled). If a component has a relatively low asset value then removal of the functionality of the component is anticipated to have minimal impact on important applications and information. In one exemplary implementation, additional protection including protection directed to prevent the intrusive attack from spreading can be added to a component and the component returned to the network.

It is appreciated that there are times when disconnecting a component from the network is not desirable. For example, if a component has a relatively high asset value and disruption to the functionality of important applications and information is anticipated to have significant impact, the functionality provided by the component can be critical and disconnecting the component from the network for even a short period of time could be devastating. In one embodiment of the present invention, a component can be left communicating with the network but the communication rate is slowed down. By leaving the component communicating with the network but with a slower communication input, the critical operations can continue while still increasing the likelihood of implementing additional attack mitigation actions or measures before an attack spreads to the component.

In one embodiment, mitigation actions include adding protective elements to a component communication path. For example, a firewall is added in a component communication path to provide an additional barrier to prevent attacks reaching the component. In addition, a component that has been attacked can be "quarantined" by reconfiguring communication links to isolate the component on a separate virtual local area network (VLAN).

In one embodiment of the present invention, attack diffusion mitigation procedures or actions are directed by a computer system (e.g., computer system 300). A processor (e.g., processor 351) performs instructions for determining a highest diffusion risk path and automatically mitigating diffusion of the attack and preventing and/or slowing a potential attack spread to components included in the highest risk path. Memory 352 stores the mitigation procedure or action instructions.

Figure 7:
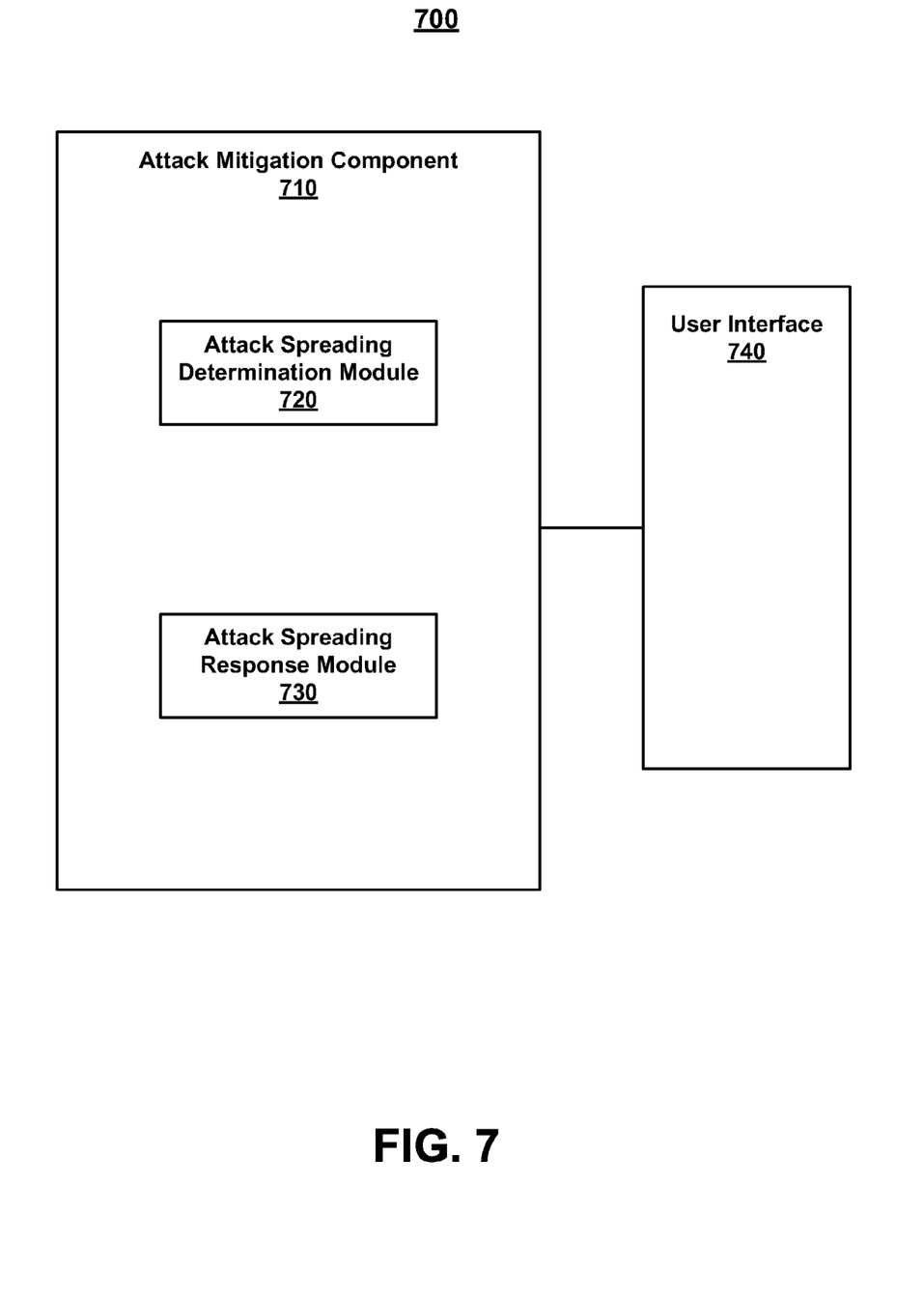
FIG. 7 is a block diagram of security intrusion spreading mitigation system 700 in accordance with one embodiment of the present invention.

FIG. 7 is a block diagram of security intrusion mitigation system 700 in accordance with one embodiment of the present invention. Attack mitigation component 710 facilitates determination of attack spreading risks and implementation of prevention and/or mitigation responses. Attack mitigation component 710 includes attack spreading determination module 720 and attack spreading response module 730. User Interface 740 provides an user interface for presenting attack spread risk and preventive action information to a user in a convenient and user friendly presentation. User interface 740 can also receive user input. For example, security intrusion mitigation system 700 can include computer readable program code embodied on a computer usable storage medium, wherein the computer readable program code causes a computer system implement security intrusion mitigation instructions.

Component risk determination module 710 determines a risk of an attack on a first component spreading to a second component included in a network. In one embodiment, the risk value includes a bias or adaptation based upon the economic value of functions the second component performs. The risk can also be biased based upon exposure or connectivity of the second component to the first component. In one exemplary implementation, an intrusion attack from an external source is detected on a first component of a network. For example, an IDS alert is registered on the first component and the IDS provides the identification of the component that is under attack. Using a greatest risk path algorithm, spanning tree representation information is examined to determine the highest risk of the attack spreading to other components (e.g., the second component) in the network. In one exemplary implementation, the attacked component is treated as a root component and the risk indications of each sub tree towards end leaf nodes are examined. In an alternate embodiment, a component above the initially attacked component in the spanning tree organization is treated as a root component.

Attack spreading response module 720 responds to the risk of an attack spreading to a first component from other components included in the network. The response is performed in accordance with the risk. In one exemplary implementation, possible communication paths are ranked in order of highest risk to lowest risk and the response (e.g., protective mitigation attention) is provided according to the rank. For example, components included in a high ranking communication path (e.g., the path with the greatest connectivity and assets of the highest value) are responded to first (e.g., given mitigation attention first) before components with a lower risk value. The response can include reducing traffic communication to the other components (e.g., the second component) of the network. The response can also include turning off an interface of selected components (e.g., the second component) in the network.

Thus, the present invention security mitigation system and method facilitate analysis and mitigation of intrusive attack diffusion threats in a network. The security intrusion mitigation system and method provide convenient and effective spanning tree representations of security risks and mitigation, including consideration of component disruption impacts to important applications and susceptibility of a component to attack from other components within a network. The efficient and convenient mitigation information and actions provide quick attack responses prioritized according to the importance of network components (e.g. relative economic value of disruptions in a component functionality) and the relative likelihood of an attack spreading to the component. The rapid and accurate mitigation facilitates minimization the disruption of component functionality due to the spread of an intrusive attack and human errors incurred in o addressing an intrusive attack on a centralized resource network.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various modifications as are suited to the particular use contemplated. It is intended that the scope of the invention be defined by the Claims appended hereto and their equivalents.

The invention claimed is:

1. A security intrusion mitigation method comprising:
utilizing network spanning tree configuration information to determine an action for mitigating diffusion of intrusive attacks between components associated with a network, wherein said spanning tree information includes an indication of a first internal diffusion risk and a second internal diffusion risk, wherein said first internal diffusion risk is a risk of a first attack diffusing from a first component associated with said network to a second component associated with said network and said second internal diffusion risk is a risk of a second attack diffusing from a third component associated with said network to said second component;
using said internal diffusion risks to determine that there is a higher risk of said first attack diffusing from said first component to said second component than said second attack diffusing from said third component to said second component; and
using said network spanning tree configuration information to perform said action for mitigating diffusion of intrusive attacks automatically at least in part by mitigating said first attack before mitigating said second attack, wherein said action for mitigating includes compensation for functional support of an application associated with said second component that has priority over another application.

2. A security intrusion mitigation method of claim 1 further comprising utilizing said internal diffusion risks to determine components forming a path in said spanning tree configuration with a highest cumulative diffusion impact risk.

3. A security intrusion mitigation method of claim 1 wherein said internal diffusion risk includes an asset value factor.

4. A security intrusion mitigation method of claim 3 wherein said asset value corresponds to an economic impact of a disruption to functionality provided by a particular component.

5. A security intrusion mitigation method of claim 1 wherein said internal diffusion risk includes an exposure rating factor.

6. A security intrusion mitigation method of claim 5 wherein said exposure rating defines a threshold value corresponding to connectivity of particular component with other components.

7. A security intrusion mitigation method of claim 5 wherein said particular component is assigned an exposure rating value based upon a connectivity distance from a root node.

8. A security intrusion mitigation method of claim 5 wherein said action is implemented in accordance with a highest risk algorithm.

9. A security intrusion mitigation method of claim 5 wherein said network spanning tree configuration information includes information associated with components included in a utility data center and said action is implemented in said utility data center.

10. A security intrusion mitigation system comprising:
a means for communicating information;
a means for processing information including instructions for determining a highest risk path that has the highest risk of an attack spreading between network components included in said highest risk path in comparison to risks of attacks spreading between network components associated with other risk paths and automatically mitigating said attack from spreading between said network components included in said highest risk path; and
a means for storing said information, including instructions for storing information describing said highest risk path.

11. A security intrusion mitigation system of claim 10 wherein said instructions include security management instructions implemented on a network application management platform.

12. A security intrusion mitigation system of claim 10 further comprising a means for interfacing with a network application management platform.

13. A security intrusion mitigation system of claim 10 wherein said instructions include attack spread risk determination instructions.

14. A security intrusion mitigation system of claim 10 further comprising a means for centrally controlling a utility data center operations.

15. A computer usable storage medium having computer readable program code embodied therein for causing a computer system to implement security intrusion mitigation instructions comprising:
a component risk determination module for determining that a first risk of a first attack spreading from a first component to a second component is higher than a second risk of a second attack spreading from a third component to a fourth component, wherein said first, second, third and fourth components are included in a network; and an attack spreading response module for responding to said first risk before responding to said second risk.

16. A computer usable storage medium of claim 15 wherein said first risk is biased based upon an economic value of functions said second component performs.

17. A computer usable storage medium of claim 15 said first risk is biased based upon connectivity of said second component to said first component in said network.

18. A computer usable storage medium of claim 17 wherein said responding includes reducing traffic communication to said second component.

19. A computer usable storage medium of claim 15 wherein said responding includes turning off an interface of said second component to said network.

20. A computer readable medium of claim 19 wherein said responding is performed in accordance with a highest risk analysis.

* * * * *

UNITED STATES PATENT AND TRADEMARK OFFICE
CERTIFICATE OF CORRECTION

PATENT NO. : 7,519,996 B2
APPLICATION NO. : 10/648555
DATED : April 14, 2009
INVENTOR(S) : Stuart Cain Page 1 of 1

It is certified that error appears in the above-identified patent and that said Letters Patent is hereby corrected as shown below:

In column 1, line 13, delete "modem" and insert -- modern --, therefor.

In column 1, line 54, delete "Modem" and insert -- Modern --, therefor.

Signed and Sealed this

Eighth Day of September, 2009

David J. Kappos
*Director of the United States Patent and Trademark Office*